(12) United States Patent
Yasuda

(10) Patent No.: US 10,088,743 B2
(45) Date of Patent: Oct. 2, 2018

(54) POLARIZATION CONVERSION ELEMENT AND PROJECTOR

(71) Applicant: SEIKO EPSON CORPORATION, Tokyo (JP)

(72) Inventor: Masanori Yasuda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/879,764

(22) Filed: Jan. 25, 2018

(65) Prior Publication Data

US 2018/0217487 A1 Aug. 2, 2018

(30) Foreign Application Priority Data

Feb. 2, 2017 (JP) .................................. 2017-017916

(51) Int. Cl.
| | | |
|---|---|---|
| G03B 21/14 | (2006.01) | |
| H04N 9/31 | (2006.01) | |
| G02B 27/28 | (2006.01) | |
| G03B 21/20 | (2006.01) | |
| G03B 21/00 | (2006.01) | |

(52) U.S. Cl.
CPC ....... G03B 21/2073 (2013.01); G02B 27/285 (2013.01); G02B 27/286 (2013.01); H04N 9/3167 (2013.01); G03B 21/006 (2013.01)

(58) Field of Classification Search
CPC ... G03B 21/14; G03B 21/2073; H04N 9/3167
See application file for complete search history.

(56) References Cited

U.S. PATENT DOCUMENTS

| 8,035,759 | B2 | 10/2011 | Kawamura | |
|---|---|---|---|---|
| 8,201,946 | B2 | 6/2012 | Horikoshi | |
| 8,657,448 | B2* | 2/2014 | Kobayashi | G02B 5/3058 349/9 |
| 9,715,168 | B2* | 7/2017 | Endo | G03B 21/2073 |
| 2005/0030479 | A1* | 2/2005 | Aruga | H04N 9/315 353/20 |

(Continued)

FOREIGN PATENT DOCUMENTS

| JP | 2010-230857 A | 10/2010 |
|---|---|---|
| JP | 5245374 B2 | 7/2013 |

*Primary Examiner* — William C Dowling
(74) *Attorney, Agent, or Firm* — Oliff PLC

(57) ABSTRACT

A polarization conversion element includes: a plurality of polarization separation layers and a plurality of reflective layers alternately disposed along a first direction; and a plurality of retardation layers. The plurality of polarization separation layers reflect first polarized light of incident light along the first direction and transmit second polarized light along a second direction orthogonal to the first direction. The plurality of reflective layers reflect, along the second direction, the first polarized light reflected by a corresponding polarization separation layer. The plurality of retardation layers are provided on an optical path of one polarized light of the first polarized light and the second polarized, and convert the one polarized light to the other polarized light. The direction of a slow axis of one and another retardation layers are line-symmetrical about an axis along a third direction orthogonal to the first and the second directions.

8 Claims, 14 Drawing Sheets

(56) References Cited

U.S. PATENT DOCUMENTS

| | | | |
|---|---|---|---|
| 2007/0019164 A1* | 1/2007 | Nakagawa | G03B 21/14 |
| | | | 353/20 |
| 2007/0188714 A1* | 8/2007 | Fuse | G03B 21/2073 |
| | | | 353/20 |
| 2009/0135316 A1 | 5/2009 | Horikoshi | |
| 2010/0245690 A1 | 9/2010 | Kawamura | |
| 2011/0051093 A1* | 3/2011 | Qu | G02B 27/285 |
| | | | 353/20 |

* cited by examiner

POLARIZATION CONVERSION ELEMENT AND PROJECTOR

BACKGROUND

1. Technical Field

The present invention relates to a polarization conversion element and a projector.

2. Related Art

In the related art, a projector including a polarization conversion element (polarizing illumination optical element) has been known, in which the polarization conversion element converts light emitted from a light source device to one kind of linearly polarized light to thereby improve use efficiency of the light emitted from the light source device in forming an image by a liquid crystal panel (e.g., see JP-A-2010-230857).

The polarizing illumination optical element included in the projector disclosed in JP-A-2010-230857 is formed of a polarizing beam splitter array and retardation films (called polarization conversion elements in JP-A-2010-230857) that are bonded at predetermined intervals on the light exiting surface-side of the polarizing beam splitter array. The polarizing beam splitter array is formed of a plurality of vertically long prism rods each having a parallelogram cross-section. The prism rods are arranged in parallel and bonded together. Polarization separation films each formed of a dielectric multilayer film and reflective films each formed of a metal film are alternately formed on the bonding surfaces of the prism rods. The prism rod is shaped such that the polarization separation film and the reflective film are inclined at 45° with respect to the normal to the incident surfaces.

The polarization separation film transmits linearly p-polarized light (p-polarized light) of non-polarized illumination light that is incident on the incident surface of the prism rod, and reflects linearly s-polarized light (s-polarized light) of the non-polarized illumination light. The p-polarized light transmitted through the polarization separation film passes through the prism rod and is emitted from the exiting surface, while the s-polarized light reflected by the polarization separation film is reflected by the reflective film and incident on the retardation film.

The retardation film has a function as a half-wave plate that rotates the polarization direction of incident light by 90°. The s-polarized light is converted to p-polarized light while passing through the retardation film.

A plurality of illumination lights that are separated by a pair of multi-lenses (lens arrays) are incident on the incident surfaces of the prism rods included in the polarizing illumination optical element. Then, the linearly polarized lights whose polarization directions are aligned by the polarizing illumination optical element are superimposed through an illumination lens on liquid crystal panels provided according to blue light, green light, and red light. Illumination light emitted through the illumination lens is separated by a plurality of dichroic mirrors into blue light, green light, and red light, and the color lights are incident on the corresponding liquid crystal panels. Then, the color lights modulated by the respective liquid crystal panels are combined by a cross dichroic prism, and projected as full-color image light by a projection lens.

Examples of the retardation film include, for example, a retardation film formed of two overlapping quartz crystal plates whose crystal axes (optic axes) are oriented differently and which have fast and slow axes intersecting each other. Such a retardation film cannot realize retardation (phase delay) that provides an ideal $\lambda/2$ in the entire visible light range, and in addition has a problem in that polarization conversion efficiency varies depending on the incident angle of light.

Specifically, in the case where the polarization conversion efficiency of the retardation film obtained when light is incident in a direction orthogonal to the light incident surface is defined as reference efficiency, the polarization conversion efficiency obtained when light is inclinedly incident on the light incident surface of the retardation film shifts to the short wavelength side or the long wavelength side with respect to the reference efficiency.

For example, in the case where the retardation film is viewed from the light incident side along the normal to the light incident surface, when the optical path of light that is inclinedly incident on the light incident surface is along the slow axis, the polarization conversion efficiency of the retardation film shifts to the short wavelength side compared to the reference efficiency.

On the other hand, in the case where the retardation film is viewed from the light incident side along the normal to the light incident surface in the same manner, when the optical path of light that is inclinedly incident on the light incident surface is along a direction orthogonal to the slow axis, the polarization conversion efficiency of the retardation film shifts to the long wavelength side with respect to the reference efficiency.

The shift amount of the polarization conversion efficiency increases as the incident angle of light with respect to the light incident surface increases.

As described above, since the polarization conversion efficiency varies according to the incident angle of light, it is impossible to provide expected retardation for the light inclinedly incident with respect to the light incident surface. This reduces the amount of light that is converted from one of p-polarized light and s-polarized light to the other.

When the illumination light passing through the polarizing illumination optical element including the retardation film described above is incident on a polarizer provided in front of the liquid crystal panel, light whose polarization direction is not rotated in a direction in which the light passes through the polarizer is blocked. For this reason, there is a problem in that when light emitted from the polarizing illumination optical element is separated into a plurality of color lights, and then the plurality of color lights are incident on the corresponding liquid crystal panels via the polarizers, color unevenness occurs in an image formed by the color lights modulated by the liquid crystal panels.

The problem due to the incident angle of light with respect to the retardation film can be mitigated by a retardation film formed of more overlapping quartz crystal plates (e.g., four quartz crystal plates). However, the retardation film has problems in that manufacturing is complicated and the retardation film is expensive.

SUMMARY

An advantage of some aspects of the invention is to provide a polarization conversion element and a projector, both of which can suppress the occurrence of illuminance unevenness.

A polarization conversion element according to a first aspect of the invention includes: a plurality of polarization separation layers and a plurality of reflective layers alternately disposed along a first direction; and a plurality of retardation layers, wherein the plurality of polarization separation layers each reflect first polarized light of incident light along the first direction and transmit second polarized light of the incident light along a second direction orthogonal to the first direction, the plurality of reflective layers each reflect, along the second direction, the first polarized light reflected by a corresponding polarization separation layer of the plurality of polarization separation layers, the plurality of retardation layers are each provided on an optical path of one polarized light of the first polarized light reflected by the plurality of reflective layers and the second polarized light transmitted through the plurality of polarization separation layers, and convert the one polarized light incident to the other polarized light, and the direction of a slow axis of at least one retardation layer of the plurality of retardation layers and the direction of a slow axis of another retardation layer are line-symmetrical about an axis along a third direction orthogonal to the first direction and the second direction.

In the following description, one retardation layer of two kinds of retardation layers in which the directions of slow axes thereof are line-symmetrical about the axis is defined as a first retardation layer, and the other retardation layer is defined as a second retardation layer. Moreover, the polarization conversion efficiency obtained when light is incident on the light incident surface of each of the retardation layers along the normal to the light incident surface (when the incident angle is 0°) is defined as reference efficiency. The reference efficiencies of the retardation layers are substantially the same.

The polarization conversion efficiencies of the first retardation layer and the second retardation layer obtained when light that is inclined at a certain incident angle is incident on the respective light incident surfaces of the first retardation layer and the second retardation layer shift in opposite directions.

For example, in the case where the retardation layer is viewed from the light incident side along the normal to the light incident surface, when the optical path of light that is inclinedly incident on the light incident surface of the retardation layer is along the slow axis of the first retardation layer, the polarization conversion efficiency of the first retardation layer for the light shifts to the short wavelength side with respect to the reference efficiency. On the other hand, the polarization conversion efficiency of the second retardation layer obtained when light at the same incident angle is incident on the light incident surface of the second retardation layer shifts to the long wavelength side with respect to the reference efficiency.

Moreover, in the case where the retardation layer is viewed from the light incident side along the normal to the light incident surface, when the optical path of light that is inclinedly incident on the light incident surface of the retardation layer is along the slow axis of the second retardation layer (when the optical path is along a direction intersecting the slow axis of the first retardation layer), the polarization conversion efficiency of the second retardation layer for the light shifts to the short wavelength side with respect to the reference efficiency. On the other hand, the polarization conversion efficiency of the first retardation layer obtained when light at the same incident angle is incident on the light incident surface of the first retardation layer shifts to the long wavelength side with respect to the reference efficiency.

In contrast, at least one retardation layer of the plurality of retardation layers included in the polarization conversion element according to the first aspect is the first retardation layer, and another retardation layer is the second retardation layer. Therefore, variations in polarization conversion efficiency occurring when light is incident inclinedly with respect to the respective light incident surfaces of the first retardation layer and the second retardation layer can be canceled out by the first retardation layer and the second retardation layer.

Hence, when the polarization conversion element is employed in a projector, and light that passes through the polarization conversion element is incident on a region to be illuminated, such as a liquid crystal panel, through a polarizer, the occurrence of illuminance unevenness can be suppressed in the region to be illuminated. With this configuration, the occurrence of the color unevenness can be suppressed in an image that is formed and displayed.

In the first aspect, it is preferable that the number of the plurality of retardation layers is an even number, and that the directions of slow axes of two retardation layers that are located in symmetrical positions in the first direction, among the plurality of retardation layers, are line-symmetrical.

Here, one of the two retardation layers in a pair is the first retardation layer, and the other is the second retardation layer. For this reason, substantially the same amount of light can be easily incident on the first retardation layer and the second retardation layer. With this configuration, when the polarization conversion element is employed for a projector, and light that is emitted from the polarization conversion element is superimposed and incident on the region to be illuminated, the occurrence of illuminance unevenness can be suppressed in the region to be illuminated. Hence, the occurrence of the color unevenness can be favorably suppressed.

In the first aspect, it is preferable that the number of the plurality of retardation layers is an odd number, that the dimension, in the first direction, of a central retardation layer that is a retardation layer located in the center in the first direction, among the plurality of retardation layers, is larger than the dimension of another retardation layer in the first direction, and that the directions of slow axes of a pair of retardation layers that interpose the central retardation layer therebetween, among the plurality of retardation layers, are line-symmetrical to the direction of a slow axis of the central retardation layer.

According to this configuration, when the amount of light that is incident on the polarization conversion element decreases from the center in the first direction to the outside, the amount of light that is incident on the central retardation layer can be nearly equal to the amount of light that is incident on the pair of retardation layers in which the direction of the slow axes thereof is line-symmetrical to that of the central retardation layer. That is, the amounts of lights that are respectively incident on the first retardation layer and the second retardation layer in the polarization conversion element can be nearly equal to each other. Hence, with this configuration, when the polarization conversion element is employed for a projector, the occurrence of illuminance unevenness can be suppressed in the region to be illuminated, and thus, the occurrence of the color unevenness can be favorably suppressed.

In the first aspect, it is preferable that the number of the plurality of retardation layers provided is five, and that the directions of slow axes of two retardation layers that are located on the outside of the pair of retardation layers in the first direction, among the plurality of retardation layers, are line-symmetrical to each other.

According to this configuration, the directions of the slow axes of the two retardation layers located on the outside of the pair of retardation layers are line-symmetrical to each other; therefore, one of the two retardation layers is the first retardation layer, and the other is the second retardation layer. In addition, the amounts of lights that are respectively incident on the first retardation layer and the second retardation layer are nearly equal to each other; therefore, an illuminance distribution of light that is emitted from the polarization conversion element can be favorably homogenized. Hence, when the polarization conversion element is employed for a projector, the occurrence of the color unevenness can be more favorably suppressed.

A projector according to a second aspect of the invention includes: a light source device; a light modulating device that modulates light emitted from the light source device; a projection optical device that projects light modulated by the light modulating device; and the polarization conversion element described above, disposed between the light source device and the light modulating device.

According to the second aspect, advantageous effects similar to those of the polarization conversion element can be provided, and thus, the occurrence of color unevenness can be suppressed in an image that is formed by the light modulated by the light modulating device.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
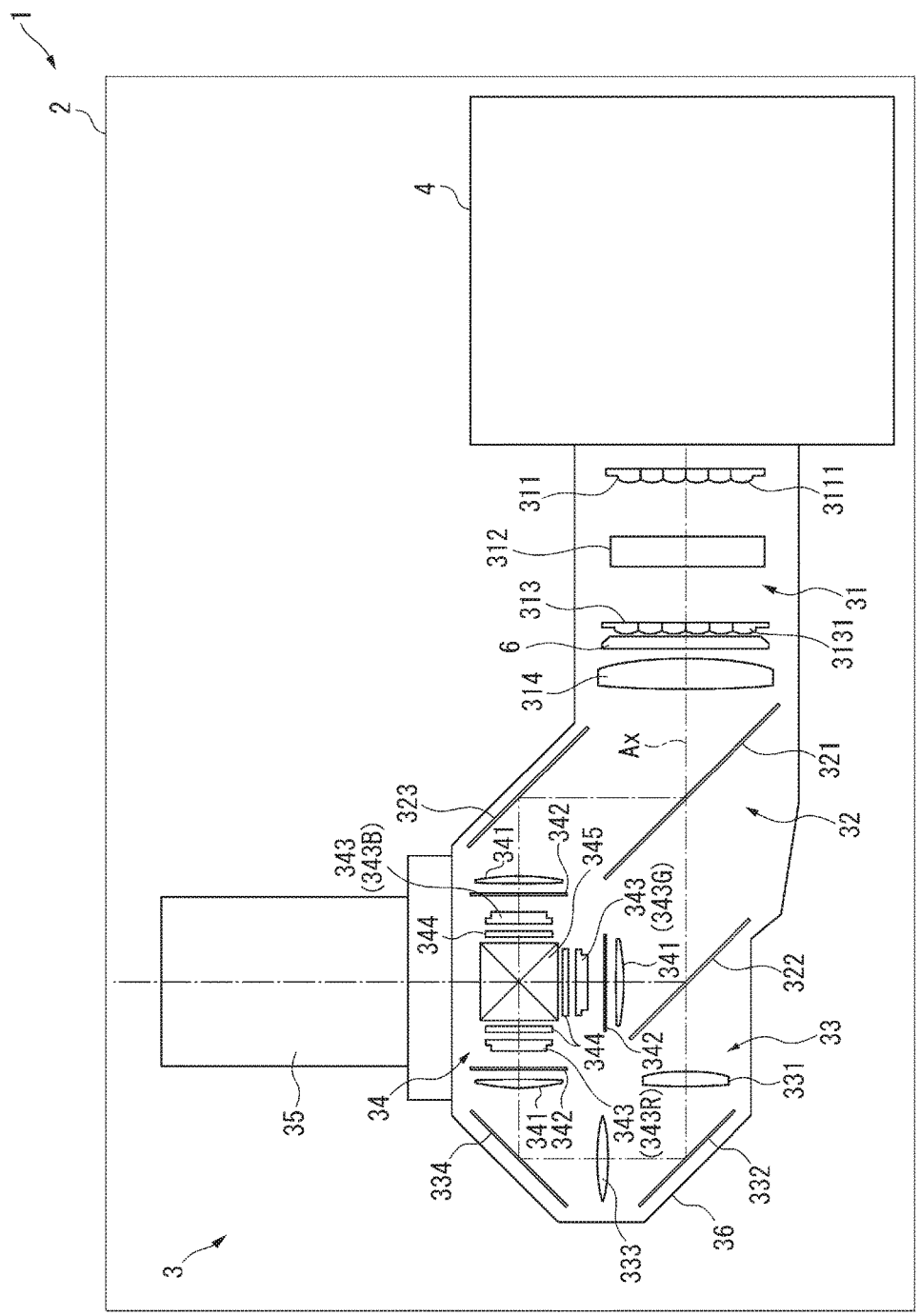
FIG. 1 is a schematic view showing the configuration of a projector according to a first embodiment of the invention.

Hereinafter, a first embodiment of the invention will be described based on the drawings.
Schematic Configuration of Projector
FIG. 1 is a schematic view showing the configuration of a projector 1 according to the embodiment.

The projector 1 according to the embodiment modulates light that is emitted from a light source device 4 provided inside the projector, to form an image in response to image information, and enlarges and projects the image onto a projection surface such as a screen. As shown in FIG. 1, the projector 1 includes an external housing 2 and a device main body accommodated in the external housing 2. One of features of the projector 1 lies in the configuration of a polarization conversion element 6 to be described later.

Hereinafter, each configuration of the projector 1 will be described.
Configuration of Device Main Body The device main body includes an image projecting device 3. In addition, the device main body includes, although not shown, a controller that controls the operation of the projector 1, a power source device that supplies power to electronic components constituting the projector 1, and a cooling device that cools cooling objects constituting the projector 1.
Configuration of Image Projecting Device Under the control of the controller, the image projecting device 3 forms and projects an image in response to image information. The image projecting device 3 includes the light source device 4, a homogenizing device 31, a color separating device 32, a relay device 33, an image forming device 34, a projection optical device 35, and an optical component housing 36. The image projecting device 3 is configured as a substantially L-shaped optical unit as a whole.
Configuration of Light Source Device The light source device 4 emits white illumination light to the homogenizing device 31. In the embodiment, the light source device 4 includes solid-state light sources such as LDs (Laser Diodes) or LEDs (Light Emitting Diodes), and a wavelength conversion device that converts the wavelength of the light emitted from the solid-state light source. However, the light source device 4 is not limited to this, and may be configured to include a discharge light source lamp such as an extra-high-pressure mercury lamp. That is, any configuration may be employed for the light source device 4.
Configuration of Homogenizing Device The homogenizing device 31 homogenizes the illuminance in a plane orthogonal to the central axis of the illumination light incident from the light source device 4. The homogenizing device 31 includes, in order of incidence of the illumination light, a first lens array 311, a dimming device 312, a second lens array 313, the polarization conversion element 6, and a superimposing lens 314.

The first lens array 311 has a configuration in which a plurality of first lenses 3111 as small lenses are arranged in a matrix in a plane orthogonal to an illumination optical axis Ax. The first lens array 311 divides incident illumination light into a plurality of partial luminous fluxes with the first lenses 3111.

The dimming device 312 is disposed between the lens arrays 311 and 313, and partially blocks the luminous fluxes incident from the first lens array 311 on the second lens array 313. With this configuration, the amount of light that is incident on light modulating devices 343, to be described later, is adjusted. The dimming device 312 may be omitted.

The second lens array 313 has a configuration in which a plurality of second lenses 3131 as small lenses corresponding to the first lenses 3111 are arranged in a matrix in the plane orthogonal to the illumination optical axis. The second lenses 3131 superimpose, in cooperation with the superimposing lens 314, the partial luminous fluxes incident from the first lenses 3111 corresponding to the second lenses 3131 on the light modulating devices 343 to be described later. The partial luminous flux emitted from each of the lenses 3131 is incident on a polarization separation layer 73 corresponding thereto in the polarization conversion element 6.

The polarization conversion element 6 has a function to align the polarization direction of incident light. The polarization conversion element 6 aligns the polarization directions of a plurality of partial luminous fluxes incident from the second lens array 313, and emits the plurality of partial luminous fluxes to the superimposing lens 314. The configuration of the polarization conversion element 6 will be described in detail later.

Configurations of Color Separating Device and Relay Device

The color separating device 32 separates a luminous flux incident from the homogenizing device 31 into three color lights of red (R), green (G), and blue (B). The color separating device 32 includes dichroic mirrors 321 and 322 and a reflecting mirror 323.

The relay device 33 is provided on the optical path of the red light having a long optical path compared to the optical paths of the other color lights, among the three separated color lights. The relay device 33 includes an incident-side lens 331, a relay lens 333, and reflecting mirrors 332 and 334.

Configuration of Image Forming Device

The image forming device 34 modulates, in response to image information, each of the color lights separated by the color separating device 32, and then combines the color lights to form image light. The image forming device 34 includes field lenses 341, incident-side polarizers 342, the light modulating devices 343, and exiting-side polarizers 344, all of which are provided for the respective separated color lights, and further includes one color combining device 345 that combines the modulated color lights to form image light.

Each of the light modulating devices (light modulating devices for red, green, and blue are respectively denoted by 343R, 343G, and 343B) employs the configuration of including a liquid crystal panel in the embodiment.

The color combining device 345 is formed of a cross dichroic prism in the embodiment, but may be formed of a plurality of dichroic mirrors joined together.

Configurations of Projection Optical Device and Optical Component Housing

The projection optical device 35 enlarges and projects the image light incident from the image forming device 34 onto the projection surface. Although not shown, the projection optical device 35 can be configured as a coupling lens including a plurality of lenses and a lens barrel that accommodates the plurality of lenses.

The optical component housing 36 accommodates optical components constituting the devices 31 to 34. The illumination optical axis Ax, which is a design optical axis, is set in the optical component housing 36. The light source device 4 and the devices 31 to 35 are disposed at predetermined positions on the illumination optical axis Ax. For this reason, the central axis of light emitted from the light source device 4 coincides with the illumination optical axis Ax.

Configuration of Polarization Conversion Element

Figure 2:
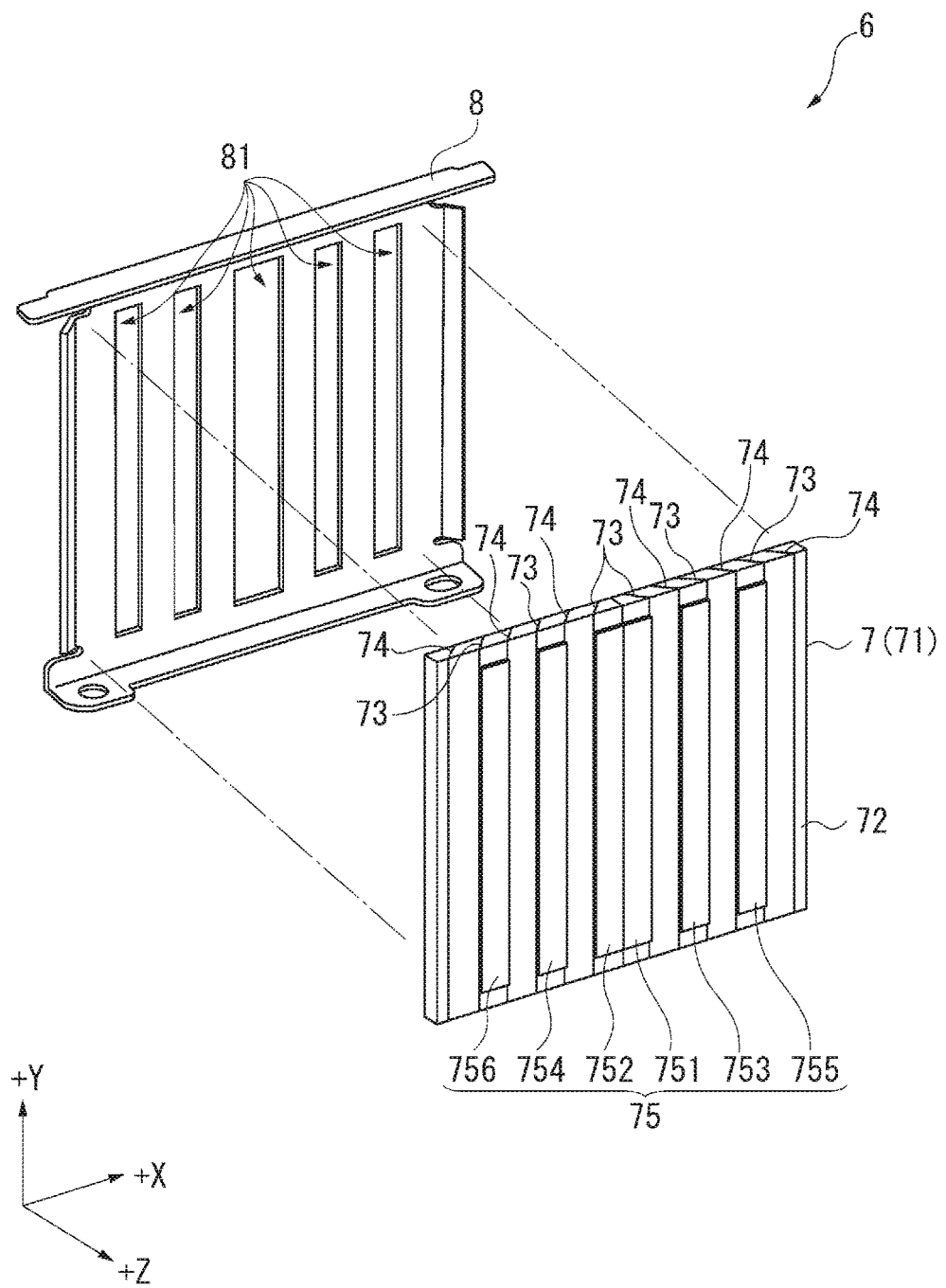
FIG. 2 is an exploded perspective view of a polarization conversion element viewed from the light exiting side in the first embodiment.

FIG. 2 is an exploded perspective view of the polarization conversion element 6 viewed from the light exiting side.

As shown in FIG. 2, the polarization conversion element 6 includes a polarization conversion section 7 and a light shielding plate 8 disposed on the light incident side of the polarization conversion section 7.

In the following description, the traveling direction of light that passes through the polarization conversion element 6 along the illumination optical axis Ax is defined as a +Z-direction (second direction). One of two directions orthogonal to the +Z-direction and orthogonal to each other is defined as a +X-direction (first direction), and the other is defined as a +Y-direction (third direction). Although not shown, the direction opposite to the +X-direction is defined as a −X-direction.

Configuration of Light Shielding Plate

The light shielding plate 8 is formed of stainless steel, an aluminum alloy, or the like, and includes openings 81 each corresponding to the polarization separation layer 73 to be described later in the polarization conversion section 7. With the light shielding plate 8, the partial luminous flux emitted from each of the second lenses 3131 is incident on the polarization conversion section 7 (the polarization separation layer 73) through the opening 81. With this configuration, the direct incidence of the partial luminous flux on a reflective layer 74 of the polarization conversion section 7 is suppressed. However, when the partial luminous flux is not directly incident on the reflective layer 74, the light shielding plate 8 is not necessarily needed.

Configuration of Polarization Conversion Section

Figure 3:
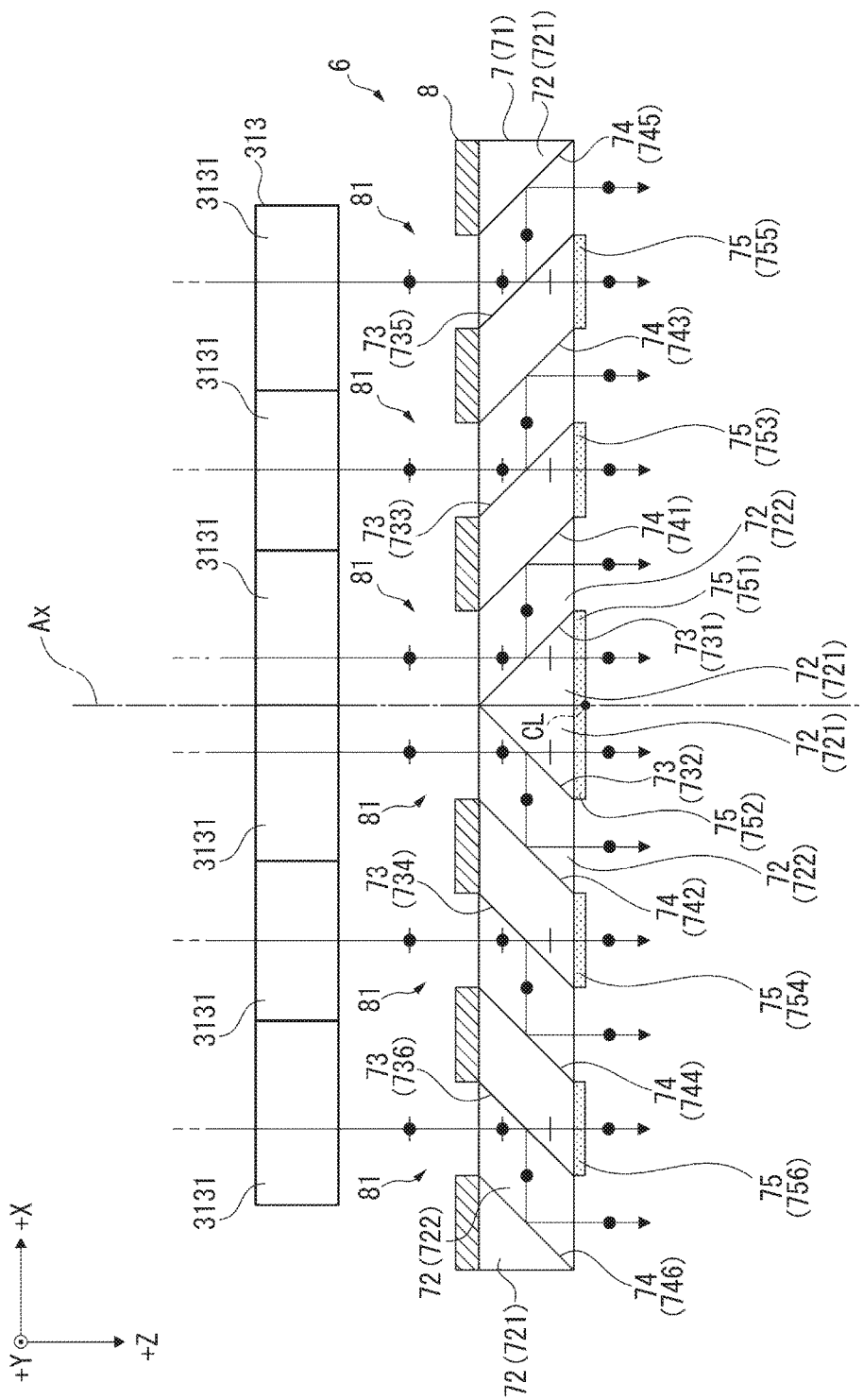
FIG. 3 is a cross-sectional view showing the polarization conversion element in the first embodiment.

FIG. 3 is a cross-sectional view (diagram showing a cross-section along the XZ plane) showing the polarization conversion element 6. In FIG. 3, the optical path of s-polarized light of light that passes through the polarization conversion element 6 is represented by the solid line with black circles, and the optical path of p-polarized light of the light is represented by the solid line with orthogonal lines.

As shown in FIG. 3, the polarization conversion section 7 includes a polarization separation element array 71 that separates an incident luminous flux into two kinds of linearly polarized lights and emits the linearly polarized lights, and a plurality of retardation layers 75 (751 to 756).

The polarization separation element array 71 includes a plurality of substrates 72, a plurality of the polarization separation layers 73, and a plurality of the reflective layers 74. The polarization separation element array 71 is configured line-symmetrically about a center line CL that passes through the center in the +X-direction and is along the +Y-direction. The center line CL intersects the illumination optical axis Ax.

The plurality of substrates 72 are each a columnar body formed of a light transmissive material (e.g., white sheet glass), and are arranged along the +X-direction. The plurality of substrates 72 include substrates 721 each having an isosceles right triangular cross-section along the XZ plane, and substrates 722 each having a parallelogram cross-section along the XZ plane. The substrates 721 and the substrates 722 are joined together, so that the polarization separation element array 71 having a plate shape as a whole is formed. The polarization separation layers 73 and the reflective layers 74 are located between the substrates 72.

The polarization separation layer 73 (731 to 736) and the reflective layer 74 (741 to 746) are each formed in a rectangular shape having a longitudinal direction in the +Y-direction. The three polarization separation slayers 73 (731, 733, 735) and the three reflective layers 74 (741, 743, 745) are alternately disposed from the center line CL toward the +X-direction. The three polarization separation layers 73 (732, 734, 736) and the three reflective layers 74 (742, 744, 746) are alternately disposed from the center line CL toward the −X-direction in the same manner. The polarization separation layers 73 and the reflective layers 74 are inclined by approximately 45° with respect to the illumination optical axis Ax.

Each of the polarization separation layers 73 is a layer to separate a polarized luminous flux including an s-polarization component and a p-polarization component into two kinds of linearly polarized lights, and is formed of a dielectric multilayer film that transmits one of the linearly polarized lights of incident light and reflects the other linearly polarized light of the incident light. In the embodiment, the polarization separation layer 73 transmits p-polarized light (second polarized light) and reflects s-polarized light (first polarized light).

Each of the reflective layers 74 functions in a pair with one polarization separation layer 73 next to the reflective layer 74. That is, one reflective layer 74 corresponds one-to-one with one polarization separation layer 73, and is disposed to be opposed to the polarization separation layer 73. The reflective layer 74 reflects the linearly polarized light reflected by the polarization separation layer corresponding thereto, along the traveling direction (+Z-direction) of the linearly polarized light passing through the polarization separation layer 73. The reflective layer 74 is formed of a reflective film formed of a dielectric multilayer film.

The retardation layer 75 (751 to 756) is located on the optical path of one linearly polarized light of the two kinds of linearly polarized lights emitted from the polarization separation element array 71, and has a function as a half-wave plate that rotates the polarization direction of the one linearly polarized light by 90° to make the polarization direction the same as the polarization direction of the other linearly polarized light.

The retardation layer 75 is provided at a portion, through which the linearly polarized light transmitted through the polarization separation layer 73 is emitted, on the light exiting surface (the light exiting surface of each of the substrates 72) of the polarization separation element array 71. In other words, when the polarization separation element array 71 is viewed from the light exiting side, the retardation layers 756, 754, 752, 751, 753, and 755 are disposed in positions respectively overlapping the polarization separation layers 736, 734, 732, 731, 733, and 735. Each of the retardation layers 75 converts the p-polarized light transmitted through the polarization separation layer 73 to s-polarized light in the course of transmitting the p-polarized light.

The retardation layer 75 is formed of two overlapping quartz crystal plates in which the optic axes (fast and slow axes) are set. The optic axes are substantially orthogonal to each other as viewed along the traveling direction of light that passes through the quartz crystal plates, and are orthogonal to the normal to the incident surfaces of the quartz crystal plates. That is, in the embodiment, the fast and slow axes set in the retardation layer 75 are orthogonal to the normal (coincident with the illumination optical axis Ax) to the light incident surface in the retardation layer 75. When the half-wave plate is realized by one quartz crystal plate, the thickness of the quartz crystal plate is very thin, and thus it is difficult to produce the half-wave plate. Therefore, the half-wave plate is formed of two overlapping quartz crystal plates.

Polarization Conversion Characteristics of Retardation Layer

In general, the polarization conversion efficiency of a retardation layer (retardation film) that is formed of two overlapping quartz crystal plates varies depending on the incident angle (crossing angle with respect to the normal to the light incident surface) of light with respect to the light incident surface in the retardation layer. In the following description, the polarization conversion efficiency of the retardation layer obtained when light is incident along the normal to the light incident surface is defined as reference efficiency.

For example, in the case where a retardation layer whose slow axis is set at a certain azimuth angle is viewed from the light incident side along the normal to the light incident surface, when the optical path of light inclinedly incident on the light incident surface is along the slow axis, the polarization conversion efficiency of the retardation layer shifts to the short wavelength side, with respect to the reference efficiency, according to the incident angle of the light.

The azimuth angle of the slow axis is an angle formed by the slow axis and a polarization plane of linearly polarized light (p-polarized light) incident on the retardation layer.

Figure 4:
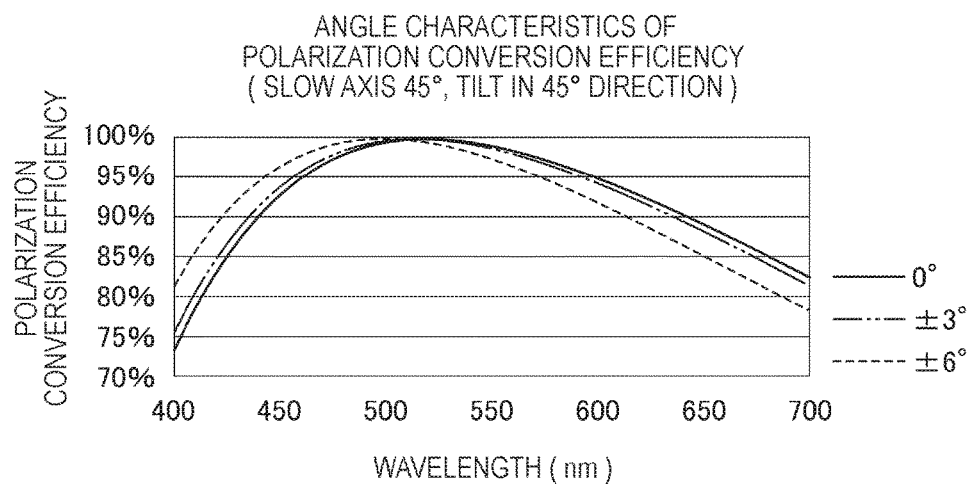
FIG. 4 is a graph showing the polarization conversion efficiency of a retardation layer in which the azimuth angle of the slow axis thereof is 45° in the first embodiment.

FIG. 4 is a graph (graph showing angle characteristics of polarization conversion efficiency) showing the polarization conversion efficiency of a retardation layer in which the azimuth angle of the slow axis thereof is 45°, obtained when light that is inclined with respect to the light incident surface is incident along the slow axis on the retardation layer, for each incident angle of the light. In FIG. 4, the polarization conversion efficiency (reference efficiency) of the retardation layer obtained when light is incident along the normal to the light incident surface (when the incident angle is 0°) is represented by the solid line, and the polarization conversion efficiency obtained when the incident angle is ±3° and the polarization conversion efficiency obtained when the incident angle is ±6° are represented respectively by the dashed-double dotted line and the dotted line.

For example, in the case where a retardation layer in which the azimuth angle of the slow axis thereof is 45° is viewed from the light incident side along the normal to the light incident surface, when the optical path of light that is inclinedly incident on the light incident surface is along the slow axis and the incident angle of the light is ±3°, the polarization conversion efficiency of the retardation layer shifts to the short wavelength side as represented by the dashed-double dotted line in FIG. 4, with respect to the reference efficiency represented by the solid line in FIG. 4.

Moreover, when the incident angle of light with respect to the light incident surface is ±6°, the polarization conversion efficiency of the retardation layer further shifts to the short wavelength side as represented by the dotted line in FIG. 4, compared to that when the incident angle is ±3°.

On the other hand, in the case where a retardation layer whose slow axis is set at a certain azimuth angle is viewed from the light incident side along the normal to the light incident surface, when the optical path of light that is inclinedly incident on the light incident surface is along a direction orthogonal to the slow axis, the polarization conversion efficiency of the retardation layer shifts to the long wavelength side, with respect to the reference efficiency, according to the incident angle (angle with respect to the normal to the light incident surface) of the light.

As described above, when the retardation layers whose slow axes are set at the same azimuth angle are employed as the retardation layers 75 of the polarization conversion element 6, the polarization conversion efficiency shifts to the short wavelength side or the long wavelength side with respect to the reference efficiency according to the incident angle of incident light.

For this reason, expected polarization conversion efficiency for linearly polarized light decreases depending on the incident angle of light with respect to the retardation layer.

When each of the color lights that are separated by the color separating device 32 after passing through the polarization conversion element 6 configured as described above is incident on the image forming region of the light modulating device 343 through the incident-side polarizer 342, illuminance unevenness occurs in the image forming region. For this reason, there is a problem in that color unevenness occurs in an image formed by the color lights modulated by the light modulating devices 343.

For the problem described above, in the embodiment, the plurality of retardation layers 75 included in the polarization conversion element 6 are disposed such that the direction of the slow axis of at least one retardation layer of the plurality of retardation layers 75 is line-symmetrical about an axis along the +Y-direction to the direction of the slow axis of another retardation layer 75.

For example, the plurality of retardation layers 75 are disposed such that when the azimuth angle of the slow axis of the at least one retardation layer 75 is 45°, the azimuth angle of the slow axis of the another retardation layer 75 is 135°.

Figure 5:
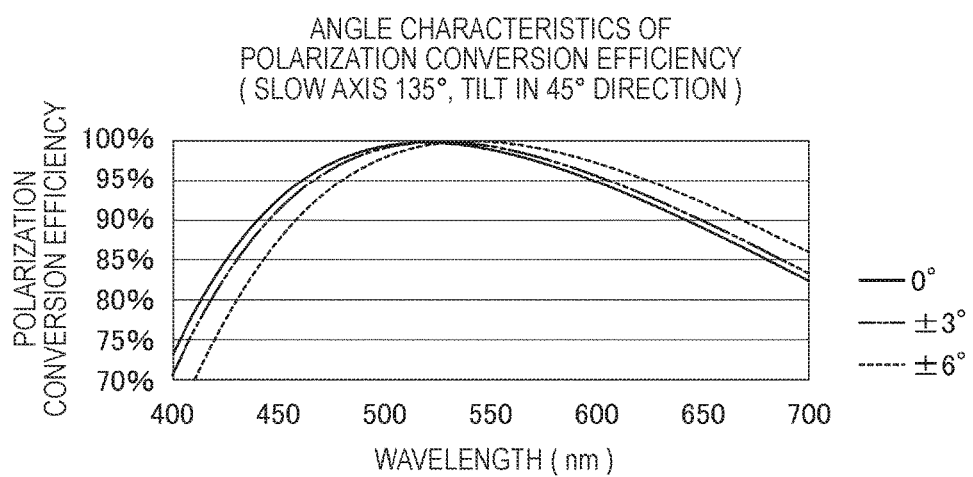
FIG. 5 is a graph showing the polarization conversion efficiency of a retardation layer in which the azimuth angle of the slow axis thereof is 135° in the first embodiment.

FIG. 5 is a graph (graph showing angle characteristics of polarization conversion efficiency) showing the polarization conversion efficiency of a retardation layer in which the azimuth angle of the slow axis thereof is 135°, obtained when light is inclinedly incident on the light incident surface along a direction orthogonal to the slow axis as viewed from the light incident side along the normal to the light incident surface, for each incident angle of the light. In FIG. 5, the polarization conversion efficiency (reference efficiency) obtained when light is incident along the normal (when the incident angle is 0°) is represented by the solid line, and the polarization conversion efficiency obtained when the incident angle is ±3° and the polarization conversion efficiency obtained when the incident angle is ±6° are represented respectively by the dashed-double dotted line and the dotted line.

Here, in the case where the retardation layer in which the azimuth angle of the slow axis thereof is 135° is viewed from the light incident side along the normal to the light incident surface of the retardation layer, when the optical path of the light inclinedly incident on the light incident surface is along the direction orthogonal to the slow axis and the incident angle of the light is ±3°, the polarization conversion efficiency of the retardation layer shifts to the long wavelength side as represented by the dashed-double dotted line in FIG. 5, with respect to the reference efficiency represented by the solid line in FIG. 5.

When the incident angle of the light with respect to the light incident surface is ±6°, the polarization conversion efficiency of the retardation layer further shifts to the long wavelength side as represented by the dotted line in FIG. 5, compared to that when the incident angle is ±3°.

The light whose optical path is along the direction orthogonal to the slow axis when the light is inclinedly incident on the light incident surface and whose incident angle is ±3°, in the case where the retardation layer in which the azimuth angle of the slow axis thereof is 135° is viewed from the light incident side along the normal to the light incident surface, and the light whose optical path is along the slow axis when the light is inclinedly incident on the light incident surface and whose incident angle is ±3°, in the case where the retardation layer in which the azimuth angle of the slow axis thereof is 45° is viewed from the light incident side along the normal to the light incident surface, have the same light traveling direction with respect to the respective retardation layers.

For this reason, variations in polarization conversion efficiency occurring when light is inclinedly incident on the light incident surface can be canceled out by the retardation layer 75 (corresponding to one of the first and second retardation layers) in which the azimuth angle of the slow axis thereof is 45° and the retardation layer 75 (corresponding to the other of the first and second retardation layers) in which the azimuth angle of the slow axis thereof is 135°. That is, variations in the polarization conversion efficiency of the retardation layers due to the incident angle of light can be canceled out between the retardation layers 75.

With this configuration, the occurrence of illuminance unevenness can be suppressed in the image forming region of each of the light modulating devices 343, and thus, the occurrence of color unevenness can be suppressed in an image that is formed by the light modulating devices 343 and displayed.

Directions of Slow Axes of Retardation Layers

Figure 6:
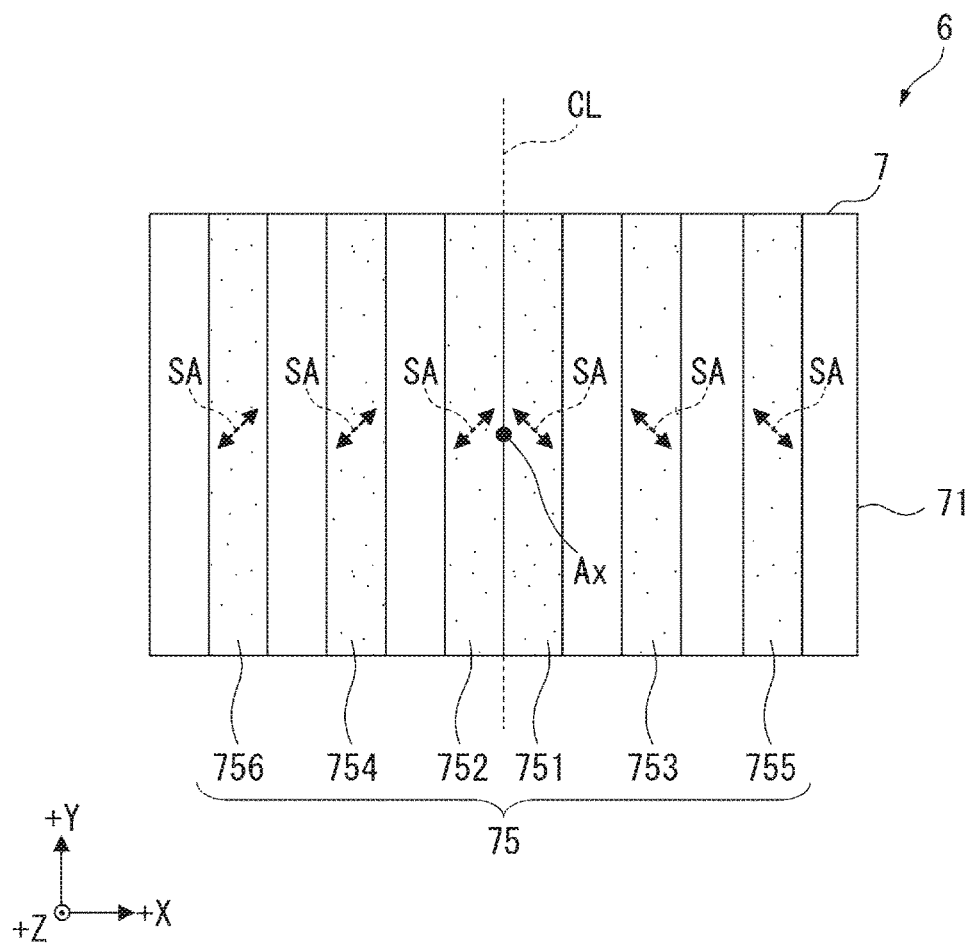
FIG. 6 is a diagram showing the directions of slow axes of retardation layers in the first embodiment.

FIG. 6 is a diagram showing the directions of slow axes SA set in the retardation layers 75 (751 to 756) of the polarization conversion element 6 as viewed from the light exiting side.

In the embodiment, as shown in FIG. 6, the six retardation layers 751 to 756 in the polarization conversion element 6 are disposed such that the directions of the slow axes SA of the retardation layers 751, 753, and 755 located on the +X-direction side with respect to the center line CL of the polarization conversion element 6 (the polarization conversion section 7) are line-symmetrical about an axis (e.g., the center line CL) along the +Y-direction to the directions of the slow axes SA of the retardation layers 752, 754, and 756 located on the −X-direction side with respect to the center line CL.

In other words, the retardation layers 751 and 752 located in the center of the polarization conversion element 6 are disposed such that the directions of the slow axes SA thereof are line-symmetrical about the axis. The retardation layers 753 and 754 interposing the retardation layers 751 and 752 therebetween are disposed such that the directions of the slow axes SA thereof are line-symmetrical about the axis. Further, the retardation layers 755 and 756 interposing the retardation layers 753 and 754 therebetween are disposed such that the directions of the slow axes SA thereof are line-symmetrical about the axis.

In the embodiment, the azimuth angle of the slow axis SA is 45° in the retardation layers 751, 753, and 755, and the azimuth angle of the slow axis SA is 135° in the retardation layers 752, 754, and 756. That is, the direction of the slow axes SA of the retardation layers 751, 753, and 755 is orthogonal to the direction of the slow axes SA of the retardation layers 752, 754, and 756.

Moreover, the slow axes SA of the retardation layers 751 to 756 are orthogonal to the normal to the incident surfaces of the retardation layers 751 to 756.

Figure 7:
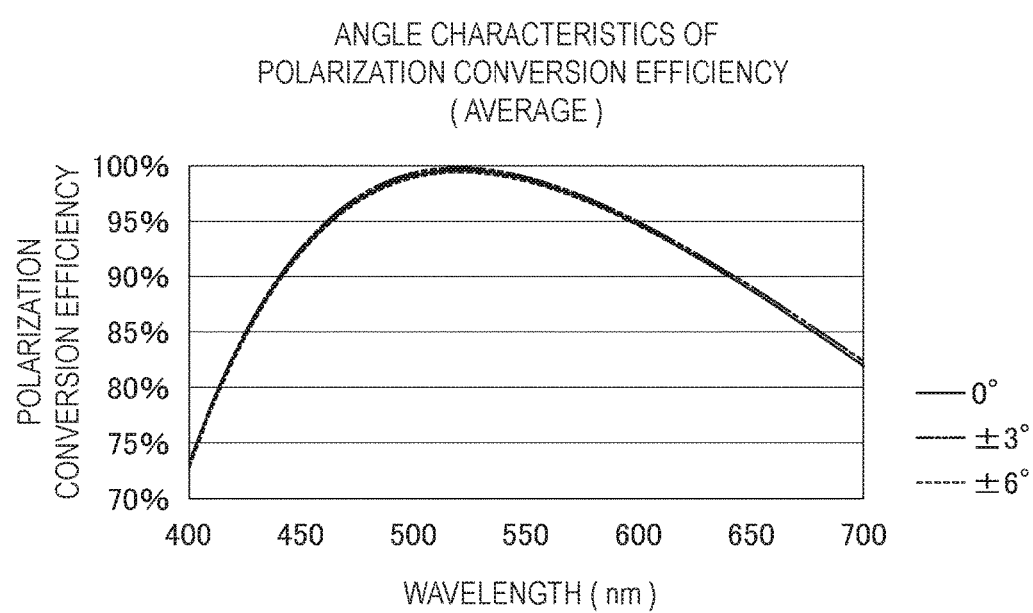
FIG. 7 is a graph showing the polarization conversion efficiency of the whole retardation layers in the first embodiment.

FIG. 7 is a graph showing the polarization conversion efficiency of the whole retardation layers 75 (the six retardation layers 75). In other words, FIG. 7 is a graph (graph showing angle characteristics of the polarization conversion efficiency) showing the average polarization conversion efficiency of the six retardation layers 75 included in the polarization conversion element 6.

According to the polarization conversion element 6 described above, the polarization conversion efficiencies of the retardation layers 75 are averaged, as shown in FIG. 7, by the retardation layers 751, 753, and 755 in which the directions of the slow axes SA thereof are parallel to each other and the retardation layers 752, 754, and 756 in which the directions of the slow axes SA thereof are line-symmetrical to those of the retardation layers 751, 753, and 755. That is, variations in polarization conversion efficiency due to the incident angle of light are canceled out between the retardation layers 751, 753, and 755 and the retardation layers 752, 754, and 756. With this configuration, variations in polarization conversion efficiency according to the incident angle of light can be suppressed in the whole retardation layers 75, and polarization conversion efficiency not depending on the incident angle can be realized. Therefore, the occurrence of the illuminance unevenness can be suppressed, and thus, the occurrence of the color unevenness can be suppressed in a displayed image.

Here, the light source device 4 emits a luminous flux whose luminance is high in the vicinity of the illumination optical axis Ax but decreases with increasing distance from the illumination optical axis Ax, depending on the type and configuration of the light source device 4.

For this reason, lights at the same luminance are incident on the retardation layers 751 and 752 (the retardation layers 751 and 752 in symmetrical positions about the center line CL) located equidistant from the illumination optical axis Ax. Similarly, lights at the same luminance are incident on the retardation layers 753 and 754 (the retardation layers 753 and 754 in symmetrical positions about the center line CL) located equidistant from the illumination optical axis Ax, and also, lights at the same luminance are incident on the retardation layers 755 and 756 (the retardation layers 755 and 756 in symmetrical positions about the center line CL) located equidistant from the illumination optical axis Ax. In addition, the directions of the slow axes SA of the retardation layers 751, 753, and 755 and the directions of the slow axes SA of the retardation layers 752, 754, and 756 are line-symmetrical to each other as described above.

With this configuration, the amount of light incident on the retardation layers 751, 753, and 755 can be coincident with the amount of light incident on the retardation layers 752, 754, and 756 in which the directions of the slow axes SA thereof are line-symmetrical to those of the retardation layers 751, 753, and 755. Hence, the occurrence of illuminance unevenness can be favorably suppressed in the image forming region illuminated by the luminous flux emitted from the polarization conversion element 6, and thus, the occurrence of color unevenness can be suppressed in formed image light.

According to the projector 1 including the polarization conversion element 6 according to the embodiment described above, the following advantageous effects can be provided.

The directions of the slow axes SA of the retardation layers 751, 753, and 755 of the six retardation layers 75 constituting the polarization conversion element 6 are line-symmetrical about the axis (e.g., the center line CL) along the +Y-direction to the directions of the slow axes SA of the retardation layers 752, 754, and 756. According to this configuration, the polarization conversion efficiency of the retardation layers 751, 753, and 755 (the first retardation layer) obtained when light is incident at a certain incident angle with respect to the light incident surface shifts in a direction opposite to that of the retardation layers 752, 754, and 756 (the second retardation layer). For this reason, variations in polarization conversion efficiency according to the incident angle of incident light can be canceled out by the retardation layers 751, 753, and 755 and the retardation layers 752, 754, and 756. That is, variations in the polarization conversion efficiency of the retardation layers 75 due to the incident angle of light can be canceled out between the retardation layers 75. With this configuration, the occurrence of illuminance unevenness can be suppressed in the image forming region of each of the light modulating devices 343 as described above. Hence, the occurrence of color unevenness can be suppressed in a projected image.

The number of the retardation layers 75 is an even number (six). The directions of the slow axes SA of the retardation layers 751 and 752 located in the symmetrical positions about the center line CL along the +Y-direction, among the retardation layers 75, are line-symmetrical. The directions of the slow axes SA of the retardation layers 753 and 754 located in the symmetrical positions are line-symmetrical in the same manner. Further, the directions of the slow axes SA of the retardation layers 755 and 756 located in the symmetrical positions about the center line CL are line-symmetrical in the same manner. According to this configuration, substantially the same amount of light can be incident on the two retardation layers 75 (two retardation layers 75 in which the directions of the slow axes thereof are line-symmetrical to each other about the axis) in a pair. Hence, the amount of light that passes through the retardation layers 751, 753, and 755 can be substantially coincident with the amount of light that passes through the retardation layers 752, 754, and 756 in which the directions of the slow axes SA thereof are line-symmetrical to those of the retardation layers 751, 753, and 755. With this configuration, an illuminance distribution of light that is superimposed and incident on the image forming region can be homogenized, and the occurrence of the illuminance unevenness and thus the occurrence of the color unevenness can be favorably suppressed.

Modifications of First Embodiment

Figure 8:
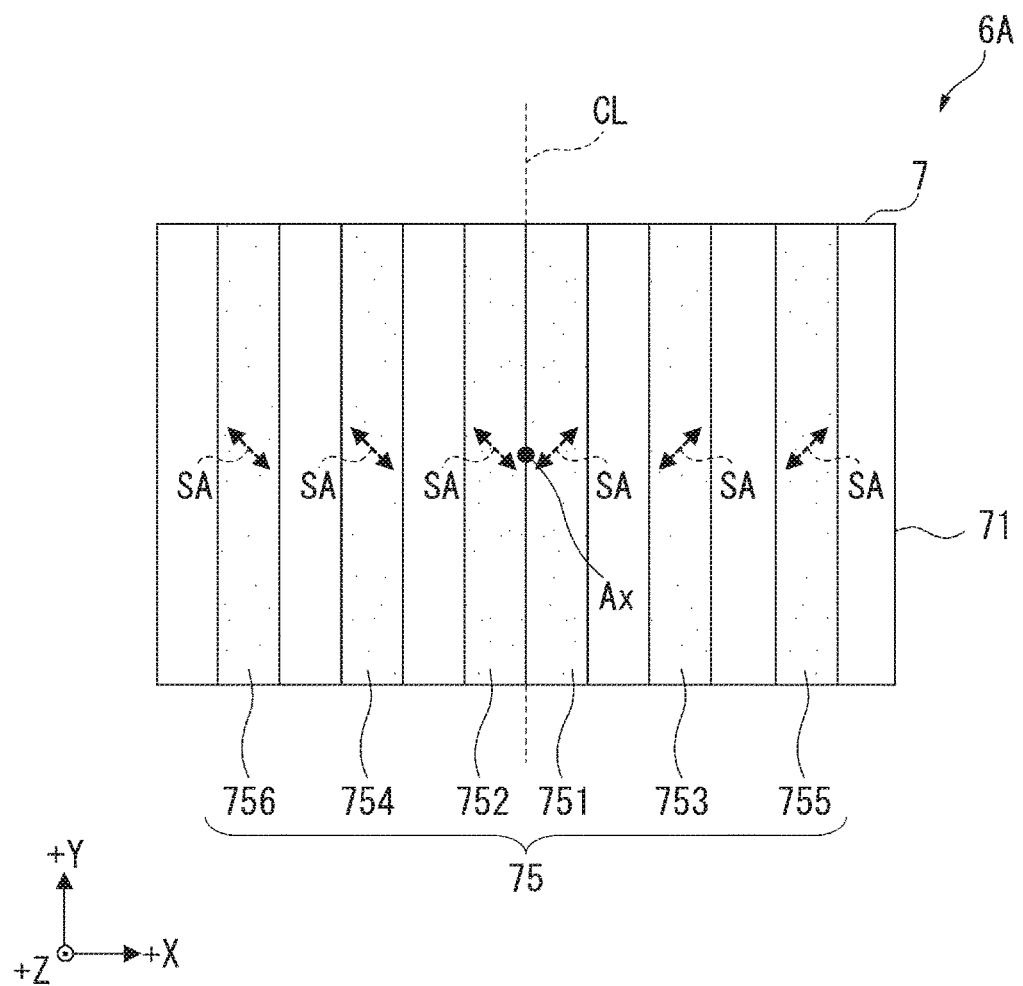
FIG. 8 is a diagram showing a modification of the polarization conversion element in the first embodiment.
Figure 9:
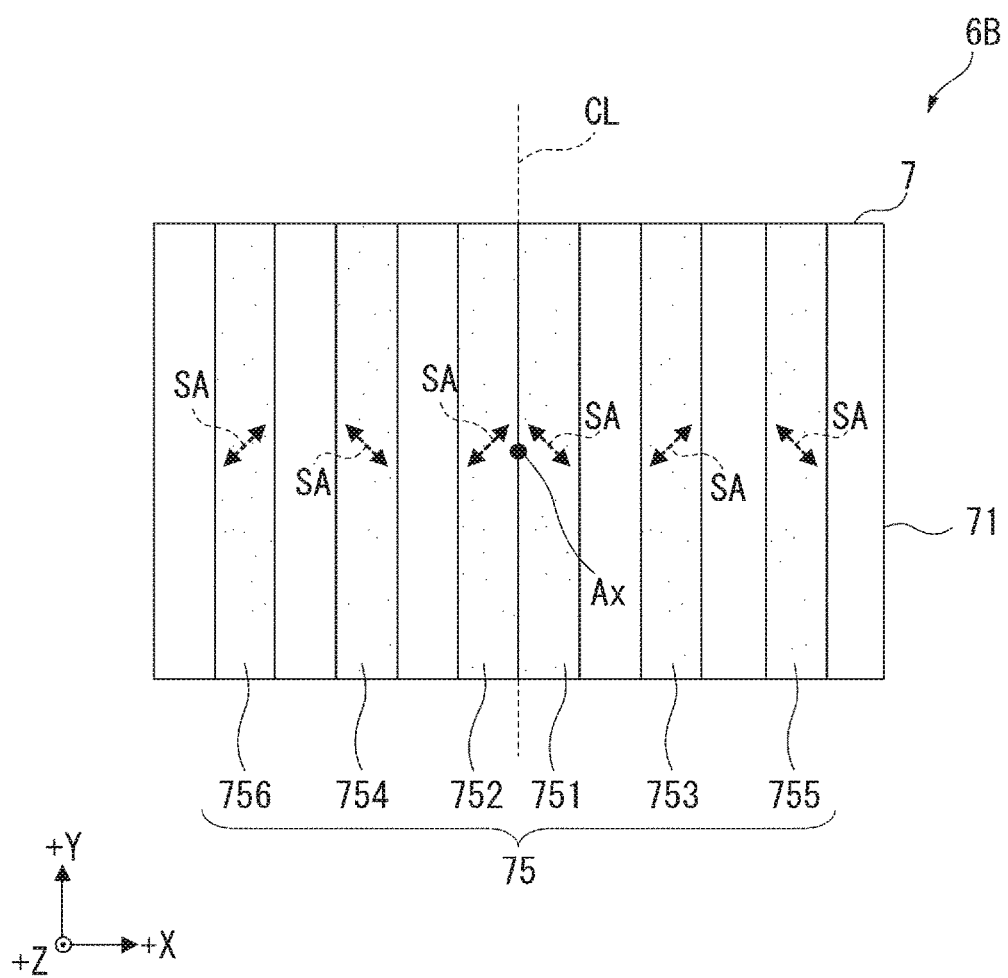
FIG. 9 is a diagram showing a modification of the polarization conversion element in the first embodiment.
Figure 10:
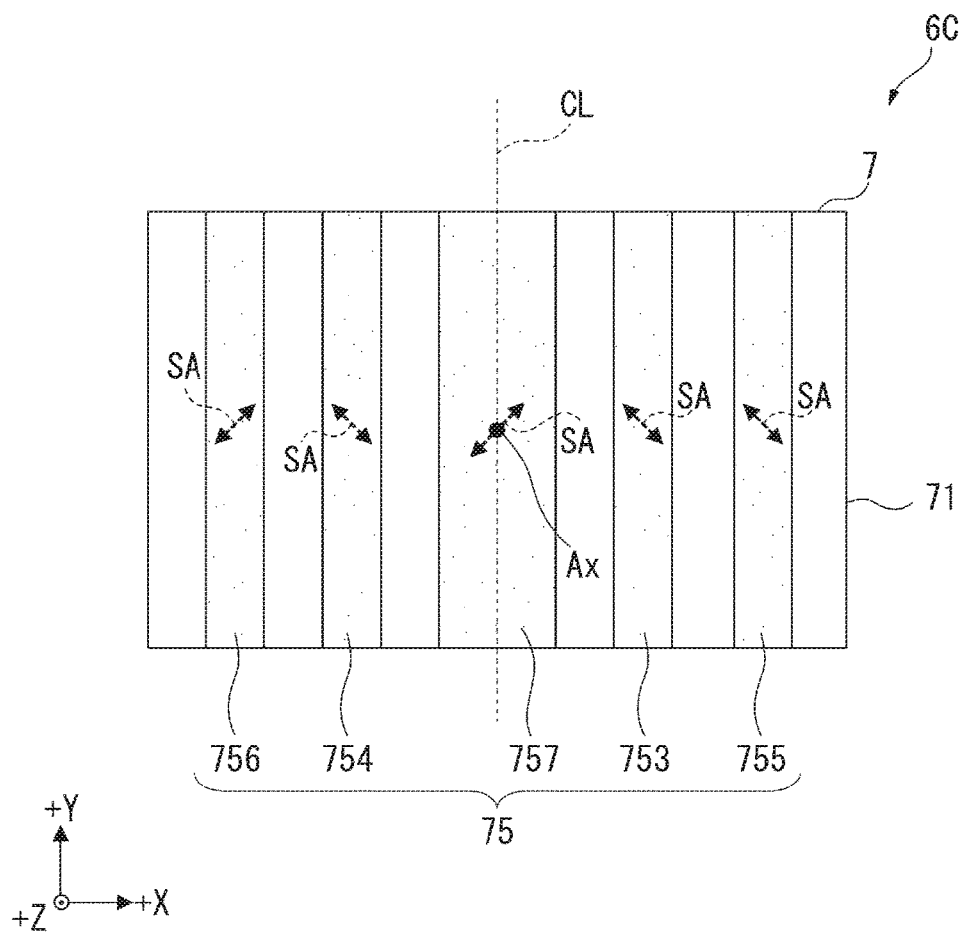
FIG. 10 is a diagram showing a modification of the polarization conversion element in the first embodiment.

FIGS. 8 to 10 are diagrams of polarization conversion elements 6A to 6C, respectively, viewed from the light exiting side.

In the polarization conversion element 6, the azimuth angle of the slow axis SA is 45° in the retardation layers 751, 753, and 755, and the azimuth angle of the slow axis SA is 135° in the retardation layers 752, 754, and 756. However, it is sufficient that the plurality of retardation layers included in the polarization conversion element are disposed such that the direction of the slow axis SA of at least one retardation layer is line-symmetrical about the axis along the +Y-direction to the direction of the slow axis SA of another retardation layer, and the directions of the slow axes SA of the retardation layers are not limited to those described above.

As the polarization conversion element, the polarization conversion elements 6A to 6C shown in FIGS. 8 to 10 are exemplified in addition to the polarization conversion element 6. The polarization conversion elements 6A to 6C have configurations and functions similar to those of the polarization conversion element 6, except that the directions of the slow axes SA of the retardation layers 75 are different.

In the polarization conversion element 6A, as shown in FIG. 8, the directions of the slow axes SA of the retardation layers 751 to 756 are reversed from those of the retardation layers 751 to 756 of the polarization conversion element 6. Specifically, in the polarization conversion element 6A, the azimuth angle of the slow axes SA of the retardation layers 751, 753, and 755 is 135°, and the azimuth angle of the slow axes SA of the retardation layers 752, 754, and 756 is 45°.

In the polarization conversion element 6B, as shown in FIG. 9, the directions of the slow axes SA of the retardation layers 751, 752, 755, and 756 are the same as those of the polarization conversion element 6. On the other hand, the directions of the slow axes SA of the retardation layers 753 and 754 are reversed from those of the retardation layers 753 and 754 of the polarization conversion element 6. Specifically, in the polarization conversion element 6B, the azimuth angle of the slow axis SA of the retardation layer 753 is 135°, and the azimuth angle of the slow axis SA of the retardation layer 754 is 45°.

Instead of or in addition to the configuration described above, the direction of the slow axis SA of at least any of the retardation layers 751 and 752 and the retardation layers 755 and 756 may be reversed from that of the polarization conversion element 6.

According also to the polarization conversion elements 6A and 6B, advantageous effects similar to those of the polarization conversion element 6 can be provided.

In the polarization conversion element 6C, as shown in FIG. 10, a retardation layer 757 (central retardation layer) formed of the retardation layers 751 and 752 integrated together is provided instead of the retardation layers 751 and 752. The dimension of the retardation layer 757 in the +X-direction is twice the dimension of each of the other retardation layers 753 to 756 in the +X-direction. The direction of the slow axis SA of the retardation layer 757 and the direction of the slow axes SA of a pair of the retardation layers 753 and 754 interposing the retardation layer 757 therebetween are line-symmetrical about the axis. On the other hand, the directions of the slow axes SA of the retardation layers 755 and 756 are line-symmetrical to each other about the center line CL as one example of the axis.

According also to the polarization conversion element 6C, advantageous effects similar to those of the polarization conversion element 6 can be provided.

In addition, the number of the retardation layers 75 is an odd number in the polarization conversion element 6C, and the dimension of the retardation layer 757 as the central retardation layer in the +X-direction is larger than the dimension of each of the other retardation layers 753 to 756 in the +X-direction as described above. The direction of the slow axis SA of the retardation layer 757 and the direction of the slow axes SA of the pair of retardation layers 753 and 754 interposing the retardation layer 757 therebetween are line-symmetrical about the axis along the +Y-direction. According to this configuration, the amount of light that is incident on the retardation layer 757 and the amount of light that is incident on the retardation layers 753 and 754 can be nearly equal to each other. Hence, an illuminance distribution of light that is superimposed and incident on the image forming region can be homogenized, the occurrence of the illuminance unevenness can be favorably suppressed, and thus, the occurrence of color unevenness can be favorably suppressed in image light.

Moreover, in the polarization conversion element 6C, the number of the retardation layers 75 provided is five, and the directions of the slow axes SA of the retardation layers 755 and 756 located on the outermost side in the +X-direction are line-symmetrical to each other. According to this configuration, the illuminance distribution can be more favorably homogenized together with the retardation layers 753, 754, and 757. Hence, the occurrence of the illuminance unevenness and the color unevenness can be more favorably suppressed.

Depending on the illuminance distribution of light that is incident on the polarization conversion element 6C, the direction of the slow axis SA of one retardation layer of the retardation layers 755 and 756 may be aligned with the direction of the slow axis SA of the retardation layer 757 or the retardation layers 753 and 754. Moreover, the retardation layer 757 may be separated into the retardation layers 751 and 752.

Second Embodiment

Next, a second embodiment of the invention will be described.

A projector according to the embodiment has a configuration similar to that of the projector 1. In the polarization conversion elements 6 and 6A to 6C, the polarization separation layers 73, the reflective layers 74, and the retardation layers 75 are disposed line-symmetrically about the center line CL. In contrast, in a polarization conversion element included in the projector according to the embodiment, the reflective layers 74 and the polarization separation layers 73 are alternately disposed from the edge in the −X-direction side toward the +X-direction and the retardation layer 75 is disposed according to the polarization separation layer 73 as viewed from the light exiting side. In this regard, the projector according to the embodiment differs from the projector 1. In the following description, portions that are the same or substantially the same as the portions previously described are denoted by the same reference numerals and signs, and will not be described here.

Figure 11:
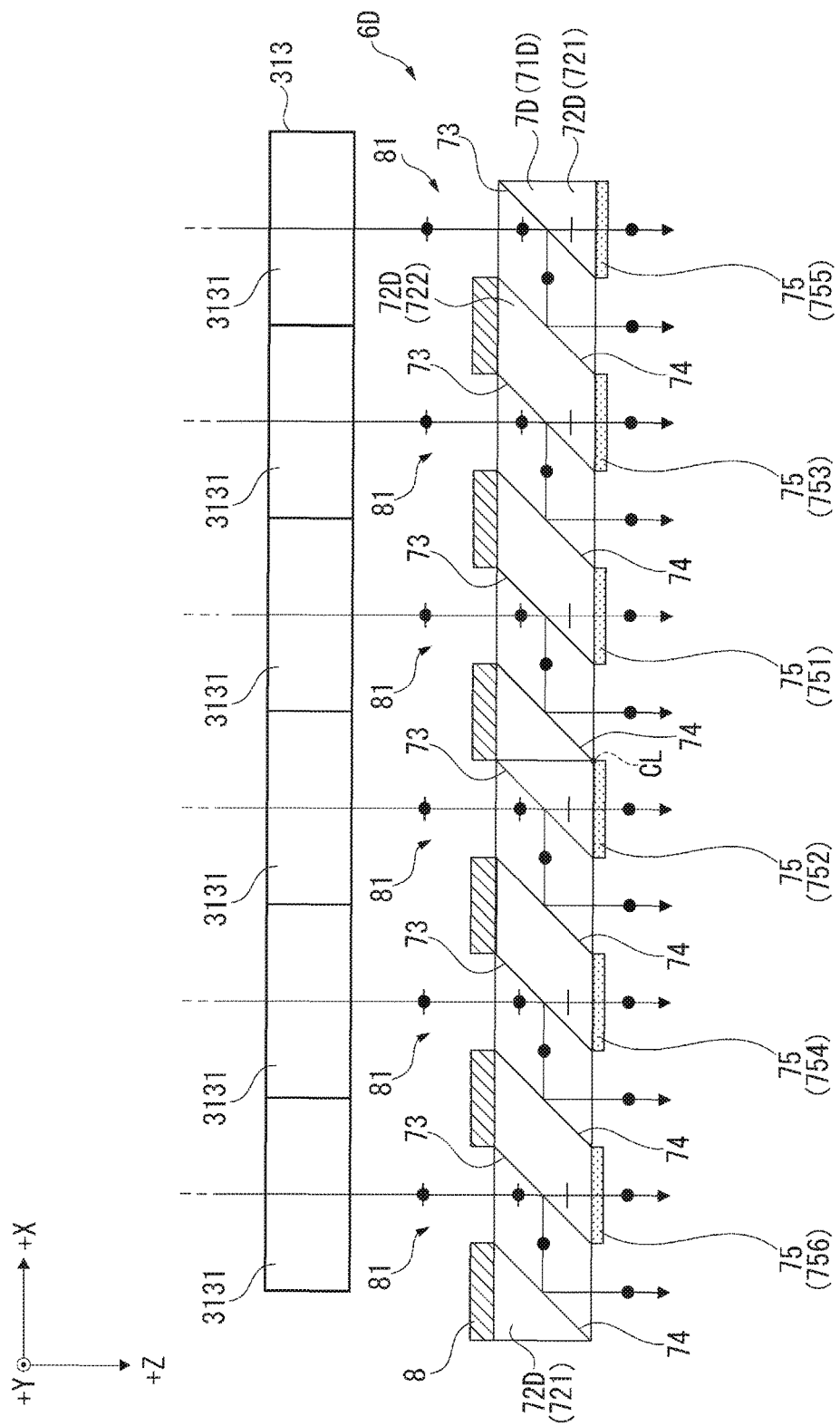
FIG. 11 is a cross-sectional view showing a polarization conversion element included in a projector according to a second embodiment of the invention.

FIG. 11 is a cross-sectional view showing the polarization conversion element 6D included in the projector according to the embodiment. More specifically, FIG. 11 is a diagram showing cross-sections, along the XZ plane, of the polarization conversion element 6D and a second lens array 313 emitting a partial luminous flux that is incident on the polarization conversion element 6D.

As shown in FIG. 11, the projector according to the embodiment has a configuration and functions similar to those of the projector 1, except that the projector according to the embodiment includes the polarization conversion element 6D instead of the polarization conversion element 6. The polarization conversion element 6D further includes a polarization conversion section 7D and a light shielding plate 8.

Similarly to the polarization conversion section 7, the polarization conversion section 7D includes a plate-shaped polarization separation element array 71D that separates a partial luminous flux incident from each of second lenses 3131 into two kinds of linearly polarized lights and emits the linearly polarized lights, and a plurality of retardation layers 75. The polarization separation element array 71D further includes a plurality of substrates 72D, a plurality of polarization separation layers 73, and a plurality of reflective layers 74.

The plurality of substrates 72D are formed of a material similar to that of the substrate 72, are each formed in a columnar shape along the +Y-direction and are arranged along the +X-direction. The plurality of substrates 72D include two substrates 721 each having an isosceles right triangular cross-section along the XZ plane, and 11 substrates 722 each having a parallelogram cross-section along the XZ plane. The substrates 722 are arranged in parallel along the +X-direction. The substrates 721 are disposed respectively at the edge on the +X-direction side and the edge on the −X-direction side. The polarization separation layer 73 or the reflective layer 74 is disposed at the interface between the two substrates 72D next to each other.

The polarization separation layers 73 and the reflective layers 74 are alternately arranged from the edge of the polarization separation element array 71D on the −X-direction side toward the +X-direction. The functions of the polarization separation layer 73 and the reflective layer 74 are as described above.

The one linearly polarized light (p-polarized light in the embodiment) is emitted from a position according to each of the polarization separation layers 73, in the light exiting surface of the polarization separation element array 71D, and the other linearly polarized light (s-polarized light in the embodiment) is emitted from a position according to each of the reflective layers 74, in the light exiting surface.

The plurality of retardation layers 75 are disposed in positions according to the polarization separation layers 73, on the light exiting surface of the polarization separation element array 71D, as in the polarization conversion element 6.

Figure 12:
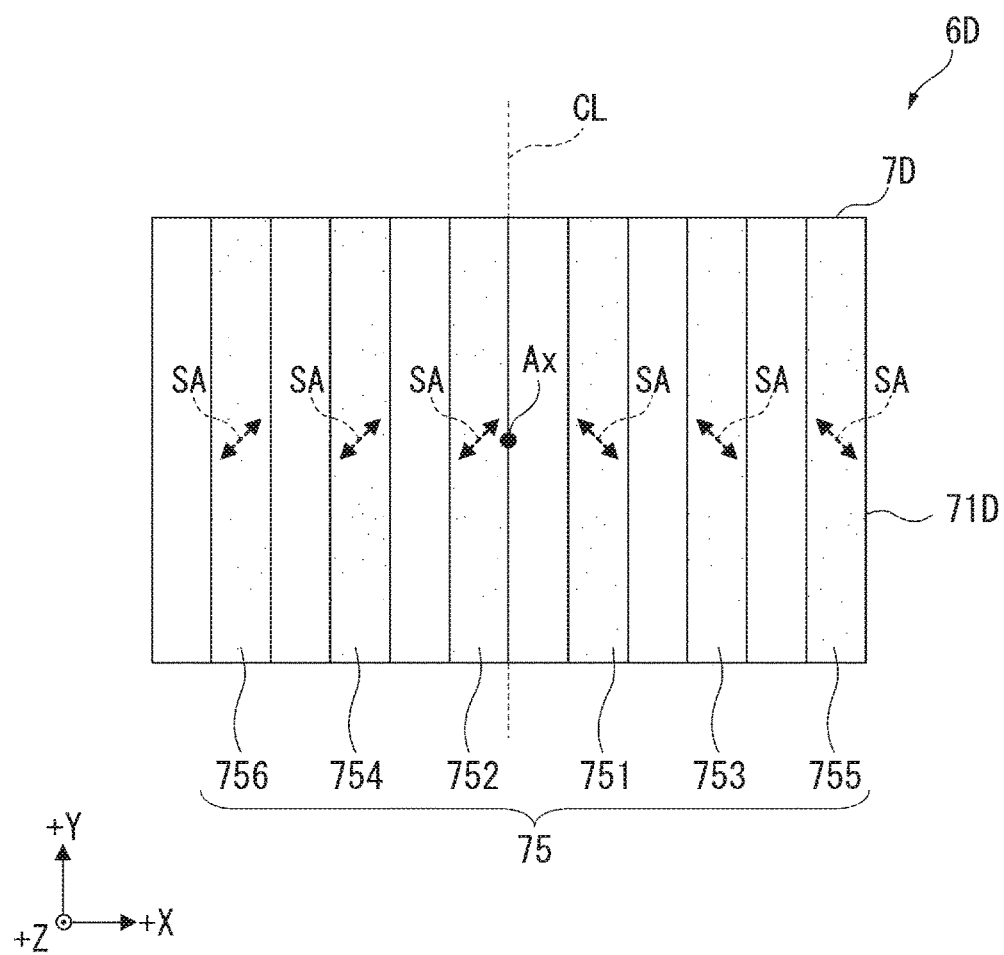
FIG. 12 is a diagram showing the directions of slow axes of retardation layers in the second embodiment.

FIG. 12 is a diagram of the polarization conversion element 6D viewed from the light exiting side, showing the directions of the slow axes SA of the retardation layers 75.

The slow axis SA of at least one retardation layer 75 of the retardation layers 75 (referred to as "retardation layers 756, 754, 752, 751, 753, and 755" in order from the −X-direction side) is line-symmetrical about an axis along the +Y-direction to the slow axis SA of another retardation layer 75.

Specifically, in the polarization conversion element 6D as shown in FIG. 12, the directions of the slow axes SA of the retardation layers 751, 753, and 755 located on the +X-direction side of the center line CL and the directions of the slow axes SA of the retardation layers 752, 754, and 756 located on the −X-direction side of the center line CL are line-symmetrical to each other about the axis along the +Y-direction. More specifically, the directions of the slow axes SA of the retardation layers 751, 753, and 755 are parallel to each other, and the azimuth angle of the slow axes SA is 45°. On the other hand, the directions of the slow axes SA of the retardation layers 752, 754, and 756 are parallel to each other, and the azimuth angle of the slow axes SA is 135°.

With this configuration, variations in polarization conversion efficiency due to the incident angle of light can be canceled out between the retardation layers 751, 753, and 755 and the retardation layers 752, 754, and 756 in which the directions of the slow axes SA are line-symmetrical to each other, as in the polarization conversion element 6. Hence, according also to the polarization conversion element 6D, advantageous effects similar to those of the polarization conversion element 6 can be provided.

With the above configuration, the directions of the slow axes SA are line-symmetrical to each other in the two retardation layers 751 and 752 close to the illumination optical axis Ax. The same applies to the two retardation layers 753 and 754 interposing the retardation layers 751 and 752 therebetween and to the two retardation layers 755 and 756 interposing the retardation layers 753 and 754 therebetween. For this reason, the amount of light that is incident on the retardation layers 751, 753, and 755 and the amount of light that is incident on the retardation layers 752, 754, and 756 can be substantially coincident with each other.

Hence, according to the projector according to the embodiment, advantageous effects similar to those of the projector 1 can be provided.

Modifications of Second Embodiment

Figure 13:
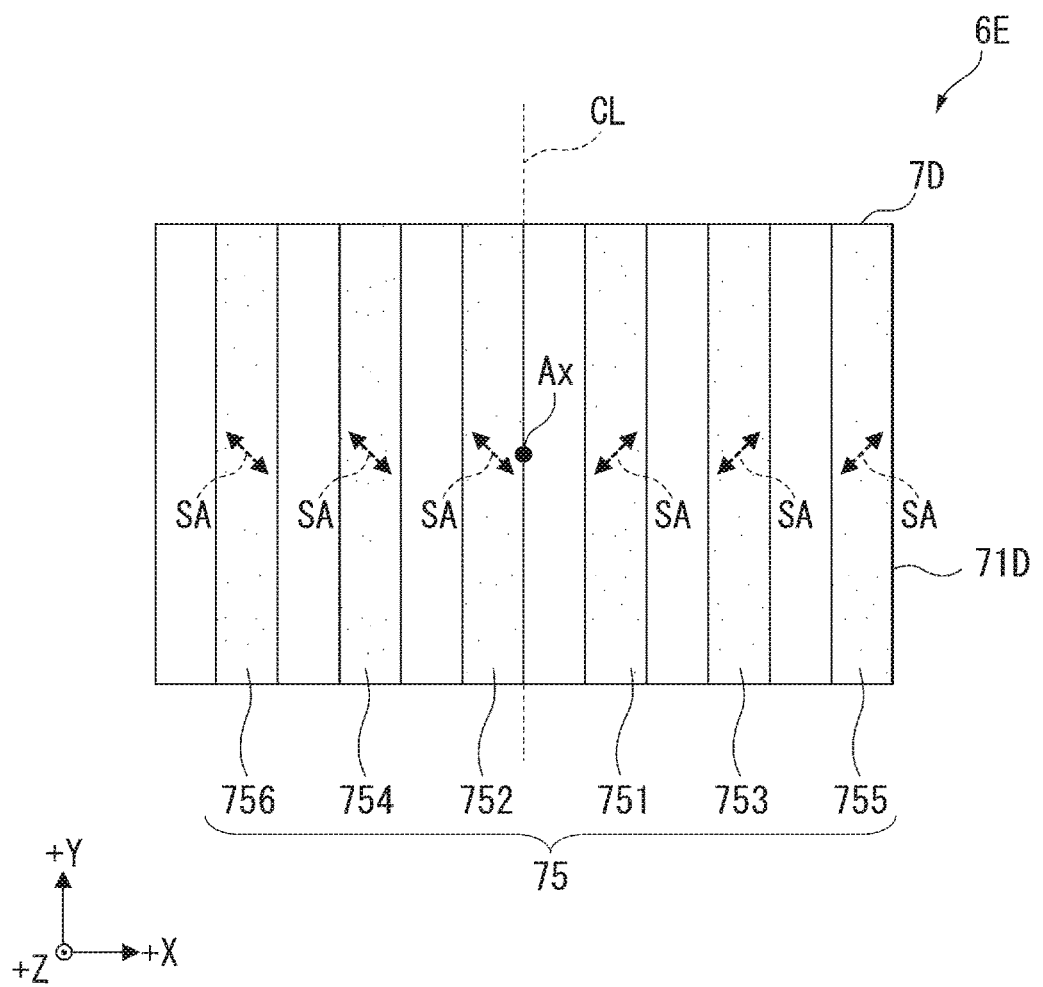
FIG. 13 is a diagram showing a modification of the polarization conversion element in the second embodiment.
Figure 14:
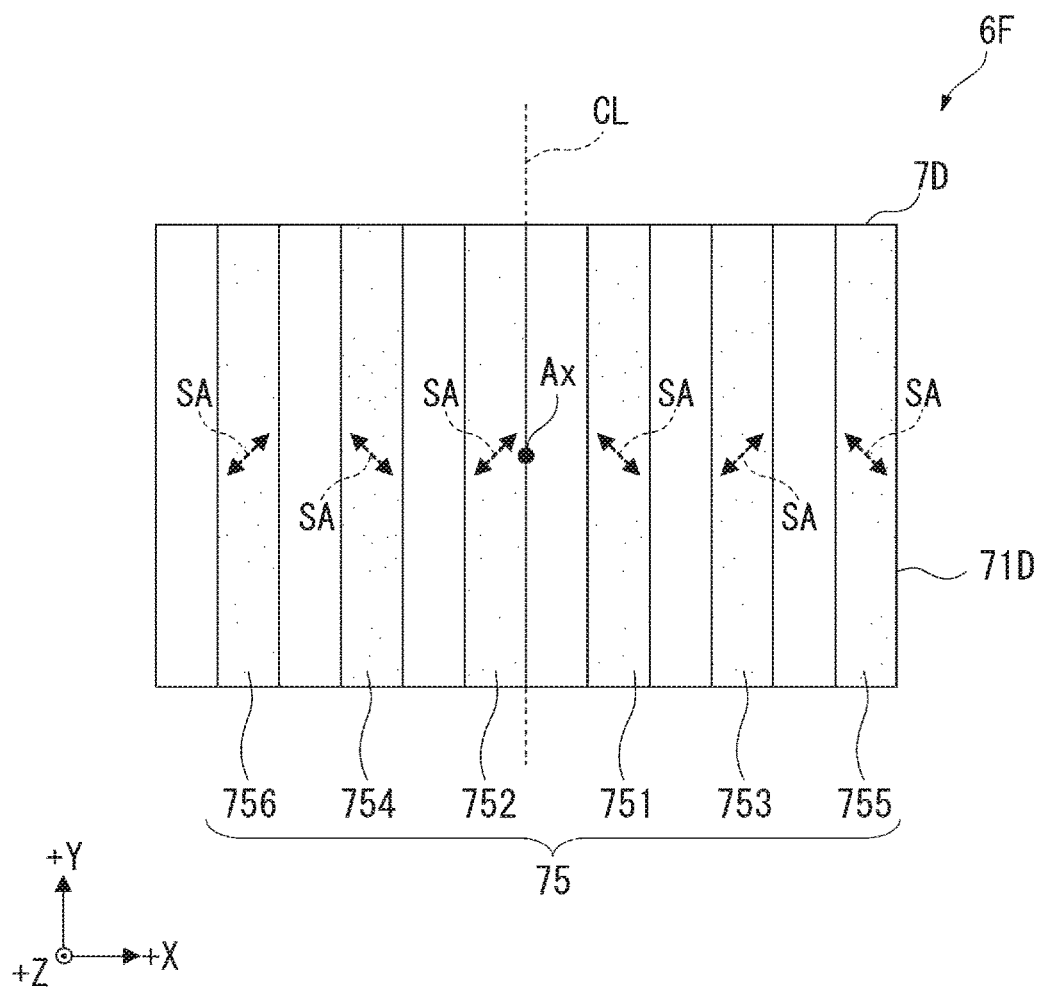
FIG. 14 is a diagram showing a modification of the polarization conversion element in the second embodiment.
Figure 15:
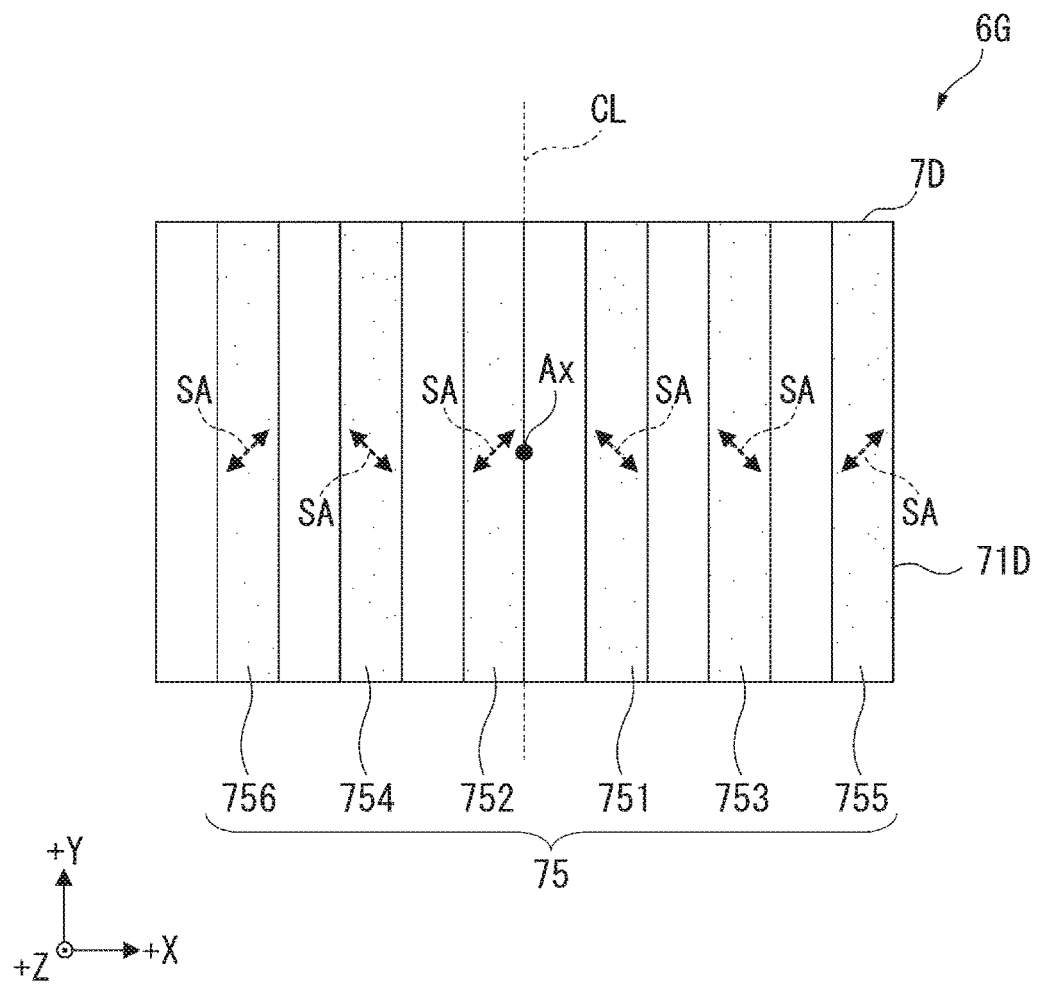
FIG. 15 is a diagram showing a modification of the polarization conversion element in the second embodiment.

FIGS. 13 to 15 are diagrams of polarization conversion elements 6E to 6G, respectively, viewed from the light exiting side.

In the polarization conversion element 6D, the azimuth angle of the slow axes SA of the retardation layers 751, 753, and 755 is set to 45°, and the azimuth angle of the slow axes SA of the retardation layers 752, 754, and 756 is set to 135°. However, it is sufficient as described above that the direction of the slow axis SA of at least one retardation layer 75 of the plurality of retardation layers 75 is line-symmetrical about the axis along the +Y-direction to the direction of the slow axis SA of another retardation layer 75. As the polarization conversion element, the polarization conversion elements 6E to 6G shown in FIGS. 13 to 15 are exemplified in addition to the polarization conversion element 6D.

The polarization conversion elements 6E to 6G have configurations and functions similar to those of the polarization conversion element 6D, except that the directions of the slow axes SA of the retardation layers 75 are different.

In the polarization conversion element 6E, as shown in FIG. 13, the directions of the slow axes SA of the retardation layers 751 to 756 are reversed from those of the retardation layers 751 to 756 of the polarization conversion element 6D. Specifically, in the polarization conversion element 6D, the azimuth angle of the slow axes SA of the retardation layers 751, 753, and 755 is 135°, and the azimuth angle of the slow axes SA of the retardation layers 752, 754, and 756 is 45°.

In the polarization conversion element 6F, as shown in FIG. 14, the directions of the slow axes SA of the retardation layers 751, 752, 755, and 756 are the same as those of the polarization conversion element 6D. However, the directions of the slow axes SA of the retardation layers 753 and 754 are reversed from those of the retardation layers 753 and 754 of the polarization conversion element 6D. That is, in the polarization conversion element 6F, the azimuth angle of the slow axis SA of the retardation layer 753 is 135°, and the azimuth angle of the slow axis SA of the retardation layer 754 is 45°.

Instead of or in addition to the configuration described above, the direction of the slow axis SA of at least any of the retardation layers 751 and 752 and the retardation layers 755 and 756 may be reversed from that of the polarization conversion element 6D.

In the polarization conversion element 6G, as shown in FIG. 15, the direction of the slow axis SA of the retardation layer 752 closest to the illumination optical axis Ax is line-symmetrical about the axis (e.g., the center line CL) along the +Y-direction to the directions of the slow axes SA of the retardation layers 751 and 754 interposing the retardation layer 752 therebetween and the retardation layer 753 located on the +X-direction side of the retardation layer 751. Moreover, the directions of the slow axes SA of the retardation layers 755 and 756 interposing the retardation layers 751 to 754 therebetween in the +X-direction are parallel to the direction of the slow axis SA of the retardation layer 752. That is, in the polarization conversion element 6G, the amount of light that is incident on the retardation layers 751, 753, and 754 is the same as the amount of light that is incident on the retardation layers 752, 755, and 756 in which the directions of the slow axes SA are line-symmetrical to those of the retardation layers 751, 753, and 754.

In this manner, the direction (azimuth angle) of the slow axis SA of each of the retardation layers 75 can be appropriately changed, without being limited to that described above, according to the luminance distribution of light that is incident on the polarization conversion element or the amount of light that is incident on each of the retardation layers 75 as described above.

According also to the polarization conversion elements 6E to 6G, advantageous effects similar to those of the polarization conversion element 6D can be provided.

Modifications of Embodiments

The invention is not limited to the embodiments, but the invention includes modifications, improvements, and the like within the scope capable of achieving the advantage of the invention.

In the embodiments and modifications, the directions and azimuth angles of the slow axes SA of the retardation layers 75 included in each of the polarization conversion elements 6, and 6A to 6G have been set such that substantially the same amount of light is incident on the retardation layer 75 having the slow axis SA at a certain azimuth angle and on the retardation layer 75 in which the direction of the slow axis SA thereof is line-symmetrical to the slow axis SA at the certain azimuth angle. However, the invention is not limited to this. It is sufficient that the direction of the slow axis of at least one retardation layer of the plurality of retardation layers included in the polarization conversion element is line-symmetrical about the axis along the +Y-direction to the direction of the slow axis of at least another one retardation layer. In this case, since the incident angle dependence of the at least one retardation layer acts in a direction to cancel out the incident angle dependence of the at least another one retardation layer, the occurrence of the illuminance unevenness and the color unevenness can be suppressed. Further, it is preferable that the direction of the slow axis of the at least one retardation layer is line-symmetrical about the axis along the +Y-direction to the direction of the slow axis of the at least another one retardation layer, and that the directions are orthogonal to each other.

Moreover, the direction of the slow axis SA of at least one retardation layer 75 (e.g., the retardation layer 751 of the polarization conversion element 6) of the plurality of retardation layers 75 has been described as being line-symmetrical about the center line CL to the direction of the slow axis SA of another retardation layer 75 (e.g., the retardation layer 752 of the polarization conversion element 6). However, the invention is not limited to this. It is sufficient that the direction of the slow axis SA of at least one retardation layer 75 and the direction of the slow axis SA of at least another one retardation layer 75 are line-symmetrical about an axis along the +Y-direction (third direction) orthogonal to the +X-direction (first direction) and the +Z-direction (second direction). This axis is not limited to the center line CL.

In the embodiments and modifications, the azimuth angle of the slow axis SA of the retardation layer 75 has been described as being 45° or 135°. However, the invention is not limited to this. The azimuth angle of the slow axis can be appropriately changed, and the slow axes SA of the retardation layers 75 may not be orthogonal to each other.

In the embodiments and modifications, the retardation layer 75 has been described as being provided according to the polarization separation layer 73 in the polarization separation element arrays 71 and 71D. That is, the retardation layer 75 has been described as being located on the optical path of the p-polarized light separated by the polarization separation layer 73. However, the invention is not limited to this. The retardation layer 75 may be disposed according to the reflective layer 74, and may be located on the optical path of the s-polarized light reflected by the reflective layer 74. In this case, the retardation layer 75 may convert incident s-polarized light to p-polarized light.

The number of retardation layers 75 has been described as being five or six. However, the invention is not limited to this. It is sufficient that a plurality of retardation layers 75 are disposed according to the polarization separation layers 73 or the reflective layers 74 corresponding thereto. Any number of polarization separation layers 73, any number of reflective layers 74, and any number of retardation layers 75 may be disposed.

In the embodiments and modifications, the polarization separation layer 73 and the reflective layer 74 have been described as being located between the plurality of substrates 72 or 72D, and the retardation layer 75 has been described as being provided on the substrate 72 or 72D. However, the invention is not limited to this. The substrates 72 and 72D are not necessarily needed when the polarization separation layer 73, the reflective layer 74, and the retardation layer 75 can be fixed.

In the embodiments and modifications, the retardation layer 75 has been described as being configured to include the quartz crystal plates. However, the invention is not limited to this. The retardation layer may be configured to include a sapphire substrate. Quartz crystal is a positive uniaxial crystal, whereas sapphire is a negative uniaxial crystal. Therefore, when light that is inclined with respect to the light incident surface is incident, the direction in which the polarization conversion efficiency shifts is opposite. However, according also to a retardation layer formed of the sapphire substrate, advantageous effects similar to those described above can be provided.

In the embodiments, the projector has been described as including the three light modulating devices 343 (343R, 343G, 343B) each including the liquid crystal panel. However, the invention is not limited to this. The invention can also be applied to a projector including two or less, or four or more, light modulating devices.

In the embodiments, the image projecting device 3 has been described as being configured such that the optical components described above are disposed in the layout shown in FIG. 1. However, the invention is not limited to this. The layout can be appropriately changed in the image projecting device 3, and a portion of the optical components may be omitted.

In the embodiments, the light modulating device 343 has been described as being configured to include the transmissive liquid crystal panel whose light incident and light exiting surfaces are different from each other. However, the invention is not limited to this. The light modulating device 343 may be configured to include a reflective liquid crystal panel whose light incident and light exiting surfaces are identical. Moreover, a light modulating device other than that of liquid crystal, such as a device using a micromirror, for example, a device using a DMD (Digital Micromirror Device), may be used as long as the light modulating device can modulate an incident luminous flux to form an image according to image information.

In the embodiments, an example of applying the polarization conversion elements 6, and 6A to 6G according to the invention to a projector has been mentioned. However, the invention is not limited to this. The polarization conversion element according to the invention may be employed for other apparatuses and devices. Moreover, an illumination device including a light source device and the polarization conversion element according to the invention may be employed for electronic apparatuses other than a projector.

The entire disclosure of Japanese Patent Application No. 2017-017916, filed Feb. 2, 2017 is expressly incorporated by reference herein.

What is claimed is:

1. A polarization conversion element comprising:
a plurality of polarization separation layers and a plurality of reflective layers alternately disposed along a first direction; and
a plurality of retardation layers, wherein
the plurality of polarization separation layers each reflect first polarized light of incident light along the first direction and transmit second polarized light of the incident light along a second direction orthogonal to the first direction,
the plurality of reflective layers each reflect, along the second direction, the first polarized light reflected by a corresponding polarization separation layer of the plurality of polarization separation layers,
the plurality of retardation layers are each provided on an optical path of one polarized light of the first polarized light reflected by the plurality of reflective layers and the second polarized light transmitted through the plurality of polarization separation layers, and convert the one polarized light incident to the other polarized light, and
the direction of a slow axis of at least one retardation layer of the plurality of retardation layers and the direction of a slow axis of another retardation layer are line-symmetrical about an axis along a third direction orthogonal to the first direction and the second direction.

2. The polarization conversion element according to claim 1, wherein
the number of the plurality of retardation layers is an even number, and
the directions of slow axes of two retardation layers that are located in symmetrical positions in the first direction, among the plurality of retardation layers, are line-symmetrical.

3. The polarization conversion element according to claim 1, wherein
the number of the plurality of retardation layers is an odd number,
the dimension, in the first direction, of a central retardation layer that is a retardation layer located in the center in the first direction, among the plurality of retardation layers, is larger than the dimension of another retardation layer in the first direction, and
the directions of slow axes of a pair of retardation layers that interpose the central retardation layer therebetween, among the plurality of retardation layers, are line-symmetrical to the direction of a slow axis of the central retardation layer.

4. The polarization conversion element according to claim 3, wherein
the number of the plurality of retardation layers provided is five, and
the directions of slow axes of two retardation layers that are located on the outside of the pair of retardation layers in the first direction, among the plurality of retardation layers, are line-symmetrical to each other.

5. A projector comprising:
a light source device;
a light modulating device that modulates light emitted from the light source device;
a projection optical device that projects light modulated by the light modulating device; and
the polarization conversion element according to claim 1, which is disposed between the light source device and the light modulating device.

6. A projector comprising:
a light source device;
a light modulating device that modulates light emitted from the light source device;
a projection optical device that projects light modulated by the light modulating device; and
the polarization conversion element according to claim 2, which is disposed between the light source device and the light modulating device.

7. A projector comprising:
a light source device;
a light modulating device that modulates light emitted from the light source device;
a projection optical device that projects light modulated by the light modulating device; and
the polarization conversion element according to claim 3, which is disposed between the light source device and the light modulating device.

8. A projector comprising:
a light source device;
a light modulating device that modulates light emitted from the light source device;
a projection optical device that projects light modulated by the light modulating device; and
the polarization conversion element according to claim 4, which is disposed between the light source device and the light modulating device.

* * * * *